(12) United States Patent
Schumacher et al.

(10) Patent No.: US 8,697,776 B2
(45) Date of Patent: Apr. 15, 2014

(54) CHEMICAL-RESISTANT METALLIC EFFECT PIGMENTS, METHOD FOR PRODUCING THE SAME AND USE THEREOF

(75) Inventors: Dirk Schumacher, Pegnitz (DE); Thomas Schuster, Lauf (DE)

(73) Assignee: Eckart GmbH (DE)

( * ) Notice: Subject to any disclaimer, the term of this patent is extended or adjusted under 35 U.S.C. 154(b) by 798 days.

(21) Appl. No.: 12/526,123

(22) PCT Filed: Feb. 7, 2008

(86) PCT No.: PCT/EP2008/000925
§ 371 (c)(1), (2), (4) Date: Aug. 6, 2009

(87) PCT Pub. No.: WO2008/095697
PCT Pub. Date: Aug. 14, 2008

(65) Prior Publication Data
US 2010/0152355 A1     Jun. 17, 2010

(30) Foreign Application Priority Data
Feb. 7, 2007   (DE) .................... 10 2007 006 820

(51) Int. Cl.
  *C08K 3/08* (2006.01)
  *C08L 83/00* (2006.01)
  *B32B 5/16* (2006.01)

(52) U.S. Cl.
  USPC ............ 523/205; 106/403; 106/415; 106/404

(58) Field of Classification Search
  USPC ............................. 523/205; 106/403, 404, 415
  See application file for complete search history.

(56) References Cited

U.S. PATENT DOCUMENTS

| | | | |
|---|---|---|---|
| 4,213,886 A | | 7/1980 | Turner |
| 4,750,940 A * | | 6/1988 | Higashi et al. ................. 524/439 |
| 5,332,767 A * | | 7/1994 | Reisser et al. ................. 523/209 |
| 5,912,283 A * | | 6/1999 | Hashizume et al. .......... 523/213 |
| 6,761,762 B1 * | | 7/2004 | Greiwe et al. ................. 106/403 |
| 7,172,812 B2 | | 2/2007 | Greiwe et al. |
| 7,578,879 B2 * | | 8/2009 | Huber et al. ................... 106/415 |
| 2006/0042508 A1 | | 3/2006 | Henglein et al. |
| 2007/0166544 A1 | | 7/2007 | Hennemann et al. |
| 2007/0199478 A1 | | 8/2007 | Schlegl et al. |
| 2008/0249209 A1 | | 10/2008 | Trummer et al. |

FOREIGN PATENT DOCUMENTS

| | | |
|---|---|---|
| CA | 2550612 | 7/2005 |
| DE | 198 20 112 A1 | 11/1999 |
| DE | 19820112 A1 * | 11/1999 |
| DE | 10 2004 006 145 A1 | 8/2005 |
| DE | 10 2004 041 592 A1 | 3/2006 |
| DE | 10 2005 037 611 A1 | 2/2007 |
| DE | 10 2006 009 131 A1 | 9/2007 |
| EP | 0 280 749 B1 | 9/1988 |
| EP | 0 477 433 B1 | 4/1992 |
| EP | 0 688 833 B1 | 12/1995 |
| EP | 1 084 198 B1 | 3/2001 |
| WO | WO 2004029160 A1 * | 4/2004 |
| WO | WO 2004/087816 | 10/2004 |
| WO | WO 2005/063897 A2 | 7/2005 |
| WO | WO 2007/017195 A2 | 2/2007 |
| WO | WO 2007/098878 A2 | 9/2007 |

OTHER PUBLICATIONS

International Search Report dated Jun. 24, 2008, issued in corresponding international application No. PCT/EP2008/000925.
German Office Action dated Oct. 18, 2007, issued in corresponding priority German application No. 10 2007 006 820.6-44.
"Bonding Agent," Wikipedia at http://de.wikipedia.org/wiki/Haftvermittler, 4 pages, Nov. 4, 2011.

* cited by examiner

*Primary Examiner* — Satya Sastri
(74) *Attorney, Agent, or Firm* — Ostrolenk Faber LLP

(57) ABSTRACT

The invention relates to metallic effect pigments having a plateletlike metal core and, surrounding the plateletlike metal core, a homogeneous synthetic resin coating, the synthetic resin coating comprising polyacrylate and/or polymethacrylate and also organofunctional silane. The invention further relates to a process for preparing such metallic effect pigments, and to their use.

17 Claims, No Drawings

CHEMICAL-RESISTANT METALLIC EFFECT PIGMENTS, METHOD FOR PRODUCING THE SAME AND USE THEREOF

CROSS REFERENCE TO RELATED APPLICATIONS

The present application is a 35 U.S.C. §371 National Phase conversion of PCT/EP2008/000925, filed Feb. 7, 2008, which claims benefit of German Application No. 10 2007 006 820.6, filed Feb. 7, 2007, the disclosure of which is incorporated herein by reference. The PCT International Application was published in the German language.

TECHNICAL FIELD

The present invention relates to electrically nonconductive metallic effect pigments which are resistant to chemicals and the effects of corrosion and which have a homogeneous layer of synthetic resin.

BACKGROUND OF THE INVENTION

The present invention also relates to a new process for preparing these metallic effect pigments of the invention and also to their use in paints, printing inks, varnishes, electrodeposition coating materials, powder coating materials, plastics, and cosmetics.

The optical effect of metallic effect pigments is based on the directed reflection of light from platelet-shaped pigment particles in parallel alignment. The luminance, and occasionally the hue as well, change with the viewing angle. Characteristic of metallic effect pigments are their metallic luster and their outstanding opacity. Important for the visual appearance are optimum distribution and also sufficient chemical stability of the metallic effect pigments in the application medium.

Disadvantageously, metallic effect pigments are of limited stability in an aqueous medium. Aluminum pigments, for example, exhibit comparatively rapid decomposition in water, forming hydrogen and aluminum hydroxide. To prevent this, the surfaces of the metallic pigment are conventionally protected by phosphating, chromating or silanizing. Becoming increasingly significant, in addition, are synthetic resin-coated metallic effect pigments, on account of their nonconductivity and their better compatibility in coating systems.

EP 0 477 433 B1 describes synthetic resin-coated, aluminum-based metallic pigments in which a layer of synthetic resin is attached covalently via a siloxane coating applied to the pigment surface. This siloxane layer is intended, as an adhesion promoter, to ensure effective attachment of the synthetic resin coat on the pigment surface. It has nevertheless emerged that, under the action of shearing forces, there may be partial detachment of the synthetic resin layer. Over a relatively long period of time, therefore, these pigments are not reliably stable toward gassing and storage.

EP 0 280 749 B1 discloses resin-coated metallic pigments where between the pigment surface and the layer of synthetic resin there is an ethylenically unsaturated carboxylic acid and/or a phosphoric monoester or diester as an adhesion promoter. The carboxyl groups of the carboxylic acid monomer and/or the phosphate groups of the phosphate monomer attach to the metallic pigment surface. The ethylenic double bonds thus arranged at the metal pigment surface are used for reaction with further monomers, to form a highly crosslinked synthetic resin layer. In spite of this three-dimensional structure to the synthetic resin coat, the gassing stability of these metallic pigments is low.

WO 2005/063897 A2 discloses chemically and mechanically stable metallic effect pigments which are coated with oligomeric and/or polymeric binders that are crosslinkable chemically and/or on exposure, for example, to UV or IR radiation. The metallic effect pigments can in this way be embedded in a polymeric film. After the metallic pigments have been coated, the binders are still curable or polymerizable, which is why the metallic pigments find use in powder coating material. In the course of coating and/or in the course of evaporation of the solvent, it is true that the binders may undergo some slight incipient polymerization, but they do not cure. Precoating the pigment surface with functionalized silanes and/or polymers or organophosphorus compounds improves the adhesion of the binder envelope.

Known from EP 1 084 198 B1 are effect pigments whose surface has been modified with orientation aids. The orientation aid, present in monomeric or polymeric form, carries at least two different functional groups which are separated from one another by a spacer. One of the functional groups is chemically attached to the pigment; the other is able to react, for example, with the binder of a surrounding coating material in a kind of crosslinking reaction, and hence is able to stabilize the pigment with nonleafing behavior. This produces effect pigments which on the one hand are readily wetted by the binder and/or solvent of the paint or varnish, and can be oriented effectively in the liquid coating film, and on the other hand enter into an intimate bond with the surrounding binder matrix. The condensation resistance of a cured coating material can be improved considerably in this way.

U.S. Pat. No. 4,213,886 discloses a coated aluminum pigment where, in a first layer, a silane with a monoethylene group and, subsequently, an acrylate resin layer is applied. It has emerged that this two-layer structure comprising silane layer with subsequent acrylate layer is not sufficiently impervious to penetration of water and chemicals.

Furthermore, DE 10 2005 037 611 describes metallic effect pigments having an inorganic/organic hybrid layer and possessing not only high mechanical stability but also good gassing stability. This hybrid layer has organic oligomers and/or polymers with an inorganic network consisting of inorganic oxide component(s) that are connected at least partly covalently via network formers. The network formers may be organofunctional silanes.

DE 10 2004 006 145 A1 discloses platelet-shaped substrates having a functional multilayer structure, composed of one or more layers of a polymer and one or more layers of a silane. The layers of one or more silanes in this arrangement exert a barrier function, and the one or more polymer layers stabilize the particles with respect to agglomeration and mechanical influences.

SUMMARY OF THE INVENTION

The object on which the present invention is based is that of providing electrically nonconductive metallic effect pigments which are resistant to chemicals and effects of corrosion and which are distinguished by application properties that are advantageous overall, more particularly high chemical resistance, gassing stability and storage stability, and electrical non-conductivity. It is a further object of the invention to provide a process for preparing these electrically nonconductive metallic effect pigments that are resistant toward chemicals and influences of corrosion.

This object has been achieved by the provision of metallic effect pigments having a plateletlike metal core and, surrounding the plateletlike metal core, a homogeneous synthetic resin coating, the synthetic resin coating comprising polyacrylate and/or polymethacrylate and also organofunctional silane.

Preferred developments are specified in the dependent claims.

The object is further achieved by the provision of a process for preparing the metallic effect pigments of any of claims 1 to 13 where the plateletlike metal core is coated homogeneously and surroundingly in the presence of acrylate compounds and/or methacrylate compounds and organofunctional silane.

Lastly the object on which the invention is based is achieved through the use of the metallic effect pigments of any of claims 1 to 13 in paints, printing inks, varnishes, powder coating materials, plastics, and cosmetics.

DETAILED DESCRIPTION

A "homogeneous synthetic resin coating" in the sense of the invention means that the synthetic resin layer is constructed not from two or more separate layers but instead from a single layer which is constructed from organofunctional silane and from acrylate and/or methacrylate compound(s) homogeneously, i.e., without perceptible substructures.

A "plateletlike metal core" or "metal core" refers in the sense to the present invention, in particular, to conventional platelet-shaped metallic effect pigments which do not have a synthetic resin coating like the metallic effect pigments in accordance with the present invention.

It has surprisingly been found that a synthetic resin layer of this kind which is homogeneous and is composed of organofunctional silane and of acrylate and/or methacrylate compound(s) adheres very reliably indeed to the metallic pigment surface and is also mechanically stable with respect to shearing forces. It has emerged, moreover, that this synthetic resin layer, which can also be termed a hybrid synthetic resin layer, protects the metallic pigments durably with respect to chemicals or highly aggressive or corrosive media, and so their optical properties, such as luster and color, are not adversely affected.

A further feature of the metallic effect pigments of the invention is that the homogeneous synthetic resin layer can be relatively thin, which on the one hand lowers the production costs, by virtue of the reduced consumption of material, and on the other hand minimizes the influence exerted on luster and color of the metallic effect pigments by the surroundingly applied synthetic resin layer.

Another advantageous feature is that the homogeneous synthetic resin layer can be applied in a single-stage process, requiring only a very simple process regime indeed, which allows the production costs of the pigments to be lowered additionally.

In accordance with one preferred development of the invention the organofunctional silane is incorporated by polymerization and/or is present in the polyacrylate and/or polymethacrylate.

It is preferred, furthermore, for the synthetic resin coating to have no inorganic network. It has been found that a pure and homogeneous synthetic resin coating, as defined in claim 1, is sufficient to provide metallic effect pigments which are resistant both to corrosion and to aggressive chemicals. The application of a pure polymeric layer is a simpler process than that of a layer in which there is an inorganic network in the synthetic resin layer.

The organofunctional silane has at least one functional group which may have been reactive chemically with an acrylate group and/or methacrylate group of the polyacrylate and/or polymethacrylate. Free-radically polymerizable organic functional groups have proven very suitable. The at least one functional group is preferably selected from the group consisting of acryloyl, methacryloyl, vinyl, allyl, ethynyl, and further organic groups with unsaturated functions.

The organofunctional silane preferably has at least one acrylate and/or methacrylate group, since these groups can be reacted to form a homogeneous polymeric layer without any problems whatsoever with the acrylate and/or methacrylate compounds that are used to generate the polyacrylate and/or polymethacrylate.

The organofunctional silane may be present in the form of a monomer or alternatively a polymer. It is essential that the monomeric or polymeric organofunctional silane has at least one functional group which allows chemical reaction with an acrylate and/or methacrylate group. It is also possible for mixtures of different monomeric and/or polymeric organofunctional silanes to be present in the synthetic resin layer.

It has emerged as being essential that the organofunctional silane is present in a form in which it is combined homogeneously with the polyacrylate and/or polymethacrylate. The organofunctional silane here need not have undergone full chemical reaction with the polyacrylate and/or polymethacrylate. The chemical reaction between organofunctional silane and polyacrylate and/or polymethacrylate may therefore have only taken place partially, with the consequence, for example, that only 30% or 40% of the organofunctional silane present, based on the total weight of organofunctional silane, has reacted with polyacrylate and/or polymethacrylate.

Preferably the organofunctional silane in the polyacrylate and/or polymethacrylate is in largely copolymerized form, i.e., largely chemically reactive form. Preferably at least 60%, more preferably at least 70%, more preferably still at least 80% of the organofunctional silane present, based in each case on the total weight of the organofunctional silane, has undergone reaction with polyacrylate and/or polymethacrylate. With further preference at least 90% or at least 95% of the organofunctional silane is present in the form in which it is reacted with polyacrylate and/or polymethacrylate. It is preferred, furthermore, if reaction has taken place to an extent of 100%.

In accordance with a further preferred variant of the present invention, the polyacrylate and/or polymethacrylate is synthesized with or from compounds having two or more acrylate and/or methacrylate groups. It has proven advantageous if the acrylate and/or methacrylate starting compounds used have two or more acrylate and/or methacrylate groups.

As well as acrylate and/or methacrylate compounds there may also be further monomers and/or polymers present in the synthetic resin coating of the metallic effect pigments of the invention. The fraction of acrylate and/or methacrylate compounds, including organofunctional silane, is preferably at least 70% by weight, more preferably at least 80% by weight, more preferably still at least 90% by weight, based in each case on the total weight of the synthetic resin coating. In accordance with one preferred variant the synthetic resin coating is synthesized exclusively from acrylate and/or methacrylate compounds and from one or more organofunctional silanes, and additionally there may also be additives such as corrosion inhibitors, chromatic pigments, dyes, UV stabilizers, etc, or mixtures thereof present in the synthetic resin coating.

It is inventively preferred for the acrylate and/or methacrylate starting compounds having two or more acrylate groups and/or methacrylate groups to have in each case at least three acrylate and/or methacrylate groups. With further preference these starting compounds may in each case also have four or five acrylate and/or methacrylate groups.

The use of polyfunctional acrylates and/or methacrylates allows the provision of metallic effect pigments having very good chemical resistance and also a relatively high electrical resistance.

The metallic effect pigments of the invention that are prepared using polyfunctional acrylates and/or methacrylates are electrically nonconducting, which considerably expands the possibilities for use of metallic effect pigments. It is therefore possible, using the metallic effect pigments of the invention, to apply metallic effect coatings to articles which must be electrically nonconducting, such as protective casings, insulators, etc, for example.

It has surprisingly emerged that even two or three acrylate and/or methacrylate groups per acrylate and/or methacrylate starting compound, in conjunction with an organofunctional silane, are sufficient to generate a synthetic resin layer on the metallic effect pigment that is electrically nonconducting and that is very chemically resistant indeed.

Particularly in the case of 2 to 4 acrylate and/or methacrylate groups per acrylate and/or methacrylate starting compound, the synthetic resin layer surprisingly has an extraordinary imperviousness and strength without being brittle. Three acrylate and/or methacrylate groups per acrylate and/or methacrylate starting compound have proven to be very suitable indeed. These mechanical properties, valuable in combination, make it possible for the metallic effect pigments of the invention to be exposed even to high shearing forces—for example, in the course of pumping through pipelines, such as in a ring circuit—without damage or detachment of the synthetic resin layer from the surface of the metallic effect pigment.

In accordance with one further preferred embodiment the weight ratio of polyacrylate and/or polymethacrylate to organofunctional silane is 10:1 to 0.5:1. With further preference the weight ratio of polyacrylate and/or polymethacrylate to organofunctional silane is in the range from 7:1 to 1:1.

It has been found that even a deficit amount, based on the weight, of organofunctional silane in relation to polyacrylate and/or polymethacrylate is sufficient for application of a synthetic resin layer which adheres firmly to the surface of the metallic effect pigment and at the same time is resistant toward chemicals or strongly corrosive ambient conditions.

In accordance with one preferred embodiment of the invention the metallic effect pigments of the present invention have a coating composed of at least two monomer components a) and b), with a) being at least one acrylate and/or methacrylate and b) being at least one organofunctional silane which preferably has at least one free-radically polymerizable functionality.

This component a) comprises preferably polyfunctional acrylates and/or methacrylates, the corresponding monomers having difunctional, trifunctional or polyfunctional acrylate and/or methacrylate groups.

Examples of suitable difunctional acrylates a) are as follows: allyl methacrylate, bisphenol A dimethacrylate, 1,3-butanediol dimethacrylate, 1,4-butanediol dimethacrylate, ethylene glycol dimethacrylate, 1,6-hexanediol diacrylate, 1,6-hexanediol dimethacrylate, diethylene glycol dimethacrylate, diurethane dimethacrylate, dipropylene glycol diacrylate, 1,12-dodecanediol dimethacrylate, ethylene glycol dimethacrylate, methacrylic anhydride, N,N-methylenebismethacrylamide, neopentylglycol dimethacrylate, polyethylene glycol dimethacrylate, polyethylene glycol-200 diacrylate, polyethylene glycol-400 diacrylate, polyethylene glycol-400 dimethacrylate, tetraethylene glycol diacrylate, tetraethylene glycol dimethacrylate, tricyclodecanedimethanol diacrylate, tripropylene glycol diacrylate, triethylene glycol dimethacrylate or mixtures thereof.

As higher polyfunctional acrylates it is possible in accordance with the invention to make use, for example, of pentaerythritol triacrylate, trimethylolpropane triacrylate, trimethylolpropane trimethacrylate, tris(2-hydroxyethyl)isocyanurate triacrylate, pentaerythritol tetraacrylate, dipentaerythritol pentaacrylate or mixtures thereof.

Particularly preferred are trifunctional acrylates and/or methacrylates.

Acrylates which have proven very suitable in the present invention are dipentaerythritol pentaacrylate, pentaerythritol triacrylate, pentaerythritol tetraacrylate, trimethylolpropane triacrylate, trimethylolpropane trimethacrylate, tris(2-hydroxyethyl)isocyanurate triacrylate, 1,6-hexanediol dimethacrylate or mixtures thereof.

Organofunctional silanes b) which can be used in accordance with the invention are, for example, (methacryloyloxymethyl)methyldimethoxysilane, methacryloyloxymethyltrimethoxysilane, (methacryloyloxymethyl)methyldiethoxysilane, methacryloyloxymethyltriethoxysilane, 2-acryloyloxyethylmethyldimethoxysilane, 2-methacryloyloxyethyltrimethoxysilane, 3-acryloyloxypropylmethyldimethoxysilane, 2-acryloyloxyethyltrimethoxysilane, 2-methacryloyloxyethyltriethoxysilane, 3-acryloyloxypropyltrimethoxysilane, 3-acryloyloxypropyltripropoxysilane, 3-methacryloyloxypropyltriethoxysilane, 3-methacryloyloxypropyltrimethoxysilane, 3-methacryloyloxypropyltriacetoxysilane, 3-methacryloyloxypropylmethyldimethoxysilane, vinyltrichlorosilane, vinyltrimethoxysilane vinyldimethoxymethylsilane, vinyltriethoxysilane, vinyltris(2-methoxyethoxy)silane, vinyltriacetoxysilane or mixtures thereof.

Particularly preferred are acrylate- and/or methacrylate-functional silanes.

Particularly preferred are acrylate- and/or methacrylate-functional silanes.

Organofunctional silanes which have proven very suitable in the present invention include 2-methacryloyloxyethyltrimethoxysilane, 2-methacryloyloxyethyltriethoxysilane, 3-methacryloyloxypropyltriethoxysilane, 3-methacryloyloxypropyltrimethoxysilane, (methacryloyloxymethyl)methyldimethoxysilane, vinyltrimethoxysilane or mixtures thereof.

The aforementioned compounds and also other suitable monomers that can be used in the present invention are available from, for example, Degussa AG, Frankfurt, Germany; Röhm GmbH & Co. KG, Darmstadt, Germany; Sartomer Europe, Paris, France; GE Silicons, Leverkusen, Germany; or Wacker Chemie AG, Munich, Germany.

The synthetic resin layer of the metallic effect pigments of the invention preferably has an average layer thickness in a range from 20 nm to 200 nm, more preferably from 30 nm to 100 nm. In accordance with a further variant of the invention the average layer thickness is in a range from 40 to 70 nm.

Very surprisingly, very low average layer thicknesses indeed in the metallic effect pigments of the invention are sufficient to reliably protect the metal cores of these pigments, these cores being very sensitive toward aggressive ambient conditions. In particular, at the stated average layer thicknesses, there is no marked deterioration in luster or color of the metal cores as a result of the synthetic resin layer.

In accordance with the invention it is preferred for the plateletlike metal core to consist of or comprise metals from the group consisting of aluminum, copper, zinc, tin, gold bronze, brass, iron, titanium, chromium, nickel, silver, gold, steel, and alloys thereof and mixtures thereof.

In accordance with a further variant according to the invention the plateletlike metal core is an aluminum pigment or gold bronze pigment.

The aluminum effect pigments used with preference may in that case take the form of leafing pigments (cf. Römpp Lexikon Lacke und Druckfarben, Georg Thieme Verlag, 1998, p. 351 "Leafing-Pigmente") or nonleafing pigments (cf. Römpp Lexikon Lacke und Druckfarben, Georg Thieme Verlag, 1998, p. 412 "Non-Leafing-Pigmente"). Leafing pigments are effect pigments which take up position at the surface or a film of liquid, such as a paint or ink film, for example. Leafing pigments are metallic effect pigments whose surface is coated generally with stearic acid. Nonleafing pigments are effect pigments which take up positions within the film of liquid, paint film or ink film, for example, i.e., not at its surface. Nonleafing pigments are metallic effect pigments whose surface is coated generally with oleic acid.

The conventional metallic effect pigments or platelet-like metal cores used in connection with the present invention may therefore exhibit leafing behavior or nonleafing behavior.

Metallic effect pigments are either platelet-shaped and substantially circular (referred to as silver dollar type) or platelet-shaped and substantially "cornflake-like" in shape (referred to as cornflake type).

The plateletlike metal core of the metallic effect pigments of the invention, i.e., without subsequent coating with synthetic resin, possesses preferably an average thickness of around 20 nm to around 2 μm, more preferably of 25 nm to 1 μm, and more preferably still of 30 nm to 600 nm.

In accordance with one further preferred embodiment of the invention the average thickness of the metal core is 20-100 nm. Aluminum pigments which have proven very suitable in the context of the present invention are those of the kind described for example in WO 2004/087816, whose disclosure content is hereby incorporated by reference. Such thin pigments have properties which in optical terms are of particularly high value.

In the metallic pigments of the invention, between the metallic pigment surface of the metal core and the synthetic resin coating, there may be a preliminary coating which improves the adhesion between metal surface and synthetic resin coat. Examples of suitable such preliminary coatings include functionalized silanes and/or polymers or organophosphorus compounds.

The metallic pigments of the invention may comprise further additives, as further constituents, in the synthetic resin coating, such as, for example, organic and/or inorganic chromatic pigments, dyes, corrosion inhibitors and/or UV stabilizers.

Additionally provided by the invention is the use of the highly stable and electrically nonconductive metallic effect pigments in paints, printing inks, varnishes, powder coating materials, electrodeposition coating materials, plastics, coating compositions, and cosmetics, and also in formulations which comprise the metallic effect pigments of the invention. The pigments of the invention may here also be present in a mixture with further pigments, such as nonmetallic effect pigments, for example.

The metallic effect pigments of the invention may be present in the form of a low-dusting or nondusting pigment formulation, as for example in the form of a paste, granules, briquettes, tablets, pellets, chips or sausages. The aforementioned presentation forms are obtainable, for example, by pasting up the metallic effect pigments of the invention with a solvent or with a solvent mixture, organic solvent and/or water, for example, and subsequently converting the paste into the desired form with removal of the solvent or solvent mixture, such as by compacting, tableting, pelletizing or extruding, etc, for example. The amount of solvent or solvent mixture may be situated in a range of up to 20% by weight, preferably of 1% to 10% by weight, more preferably of about 3% to 5% by weight, based in each case on the total weight of the pigment formulation.

The object on which the invention is based is further achieved by a coating system which comprises the metallic effect pigments of the invention. The coating system may be selected, for example, from the group consisting of paints, printing inks, varnishes, powder coating materials, electrodeposition coating materials, plastics, and cosmetics.

In view of the extraordinary stability of the metallic effect pigments of the invention with respect to chemicals they can be used in any of a very wide variety of aforementioned coating systems without being susceptible to corrosion.

The object on which the invention is based is also achieved by a coated article coated with the coating system of the invention. Examples of such articles include vehicle bodies, housings, metal components, architectural facing elements, etc.

EXAMPLES

The metallic effect pigments of the invention are notable for an extremely high chemical stability, which is shown by the examples below. The examples serve merely for further illustration of the invention and do not limit the scope of the invention.

Inventive Example 1

100 g of STAPA® METALLIC 501 (ECKART GmbH & Co. KG, Fürth, Germany) are suspended in white spirit to give a 20% by weight suspension. The pigment paste is predispersed in white spirit for about 5 minutes at 50° C. and then heated to 150° C. Over 2 hours it is admixed dropwise with a mixture of 14 g of trimethylolpropane triacrylate and 3.5 g of vinyltrimethoxysilane, with uniform stirring. After filtration and washing in white spirit, the product is isolated as a white spirit paste.

Inventive Example 2

100 g of STAPA® METALLUX 214 (ECKART GmbH & Co. KG, Fürth) are suspended in white spirit, predispersed, and heated in the same way as in example 1. Over 2 hours it is admixed dropwise with a mixture of 11 g of trimethylolpropane triacrylate and 2.75 g of vinyltrimethoxysilane, with uniform stirring. After filtration and washing in white spirit, the product is isolated as a white spirit paste.

Inventive Example 3

100 g of STAPA® METALLIC 501 (ECKART GmbH & Co. KG) are suspended in white spirit to give a 20% by weight suspension. The pigment paste is predispersed in white spirit for about 5 minutes at 50° C. and then heated to 150° C. Over 2 hours it is admixed dropwise with a mixture of 15 g of 1,6-hexanediol dimethacrylate and 3.75 g of (methacryloyloxymethyl)methyldimethoxysilane, with uniform stirring. After filtration and washing in white spirit, the product is isolated as a white spirit paste.

Comparative Examples

ASAHI CR 21: Polymer-coated aluminum pigment, available from Asahi, Japan.
ASAHI O-2100: Polymer-coated aluminum pigment, available from Asahi, Japan.
TOYAL 616EB: Polymer-coated aluminum pigment, available from Toyal, Japan.
Silberline SBC 5000-20Z: Polymer-coated aluminum pigment, available from Silberline, England.
SHOWA 260 EA: Polymer-coated aluminum pigment, available from Showa, Japan.
ECKART NCP 501: Polyacrylate-coated aluminum pigment, available from Eckart, Fürth, Germany.

Corrosion Stability Tests

The effect pigments prepared in accordance with inventive examples 1 to 3 and also the pigments employed as comparative examples were incorporated into a one-component polyurethane varnish system, in a concentration of 6% by weight in each case, based on the total weight of the coating material.

These one-component polyurethane coating systems provided with the metallic effect pigments of the invention or metallic effect pigments used for comparison purposes were each applied to PMMA plates (polymethyl methacrylate plates) by means of an HVLP coating gun (HVLP: High Volume-Low Pressure) and subsequently cured at 60° C. in a drying cabinet for 12 hours. 24 hours after curing of the respective coating system, drops of 1 M NaOH were applied to the PMMA plate, the size of the drops having a diameter of 10 to 17 mm. Following application of the drops at 22° C., the drops were allowed to act on the coated PMMA plate for 15 minutes, 30 minutes, 60 minutes, 120 minutes, and 180 minutes, after which the drops were rinsed off under running water and the PMMA plates were dried in air at 22° C. This was followed by visual evaluation of the drop regions on the PMMA plates for the degree of graying.

This degree of graying was assessed in accordance with the following system:

| | |
|---|---|
| 0 points: | no graying perceptible at all |
| 1 point: | first sign of graying just perceptible |
| 2 points: | distinct sign of graying |
| 3 points: | complete graying |

The points determined for each of the five above-mentioned time periods (15 minutes, 30 minutes, 60 minutes, 120 minutes, 180 minutes) were added together.

The figures added together are shown in table 1 below for all of the pigments investigated.

TABLE 1

| Forced chemical test in 1-component polyurethane system | | |
|---|---|---|
| Type | $D_{50}$ (µm) | Total |
| ASAHI CR 21 | 27.80 | 10 |
| ASAHI O-2100 | 12 | 12 |
| TOYAL 616EB | 17 | 12 |
| Silberline SBC 5000-20Z | 11 | 11 |
| SHOWA 260 EA | 15 | 13 |
| ECKART NCP 501 | 22 | 10 |
| Inv. example 1 | 21 | 3 |
| Inv. example 2 | 35 | 2 |
| Inv. example 3 | 21 | 2 |

Furthermore, the metallic effect pigments of the invention have a very good weathering stability and also very good dispersing characteristics. On account of their mechanical stability and chemical resistance or corrosion stability, the metallic effect pigments of the invention are very suitable for a wide variety of fields of application and of paint and varnish systems. The metallic effect pigments of the invention can therefore be used advantageously in conventional solvent-based coating systems and in aqueous coating systems.

What is claimed is:

1. Metallic effect pigments having a plateletlike metal core and, surrounding the plateletlike metal core, a homogeneous synthetic resin coating, wherein the synthetic resin coating comprises at least one of polyacrylate and polymethacrylate, and also organofunctional silane, and wherein the polyacrylate is synthesized with or from compounds having two or more acrylate groups and the polymethacrylate is synthesized with or from compounds having two or more methacrylate groups, and wherein the average layer thickness of the synthetic resin coating is 20 to 200 nm.

2. The metallic pigments of claim 1, wherein
the organofunctional silane is at least one of copolymerized and present in at least one of the polyacrylate and the polymethacrylate.

3. The metallic pigments of claim 1, wherein the synthetic resin coating has no inorganic network.

4. The metallic pigments of claim 1,
wherein the polyacrylate has at least three acrylate groups and the polymethacrylate has at least three methacrylate groups.

5. The metallic effect pigments of claim 1,
wherein the weight ratio of the at least one of polyacrylate and polymethacrylate to organofunctional silane is 10:1 to 0.5:1.

6. The metallic effect pigments of claim 4,
wherein the weight ratio of the at least one of polyacrylate and polymethacrylate to organofunctional silane is 7:1 to 1:1.

7. The metallic effect pigments of claim 1,
wherein the average layer thickness of the synthetic resin coating is 30 to 100 nm.

8. The metallic effect pigments of claim 1
wherein the polyacrylate contains two or more acrylate groups and the polymethacrylate contains two or more methacrylate groups and wherein the polyacrylate is synthesized with or from compounds having at least three acrylate groups and wherein the polymethacrylate is synthesized with or from compounds having at least three methacrylate groups.

9. The metallic effect pigments of claim 1,
wherein the organofunctional silane is selected from the group consisting of 2-methacryloyloxyethyltrimethoxysilane, 2-methacryloyloxyethyltriethoxysilane, 3-methacryloyloxypropyltriethoxysilane, 3-methacryloyloxypropyltrimethoxysilane, (methacryloyloxymethyl)methyldimethoxysilane, vinyltrimethoxysilane, and mixtures thereof.

10. The metallic effect pigments of claim 1, wherein the plateletlike metal core comprises at least one metal selected from the group consisting of aluminum, copper, zinc, tin, gold bronze, brass, iron, titanium, chromium, nickel, silver, gold, steel, and alloys thereof and mixtures thereof.

11. The metallic effect pigments of claim 1, wherein the plateletlike metal core is an aluminum pigment or gold bronze pigment.

12. A process for preparing the metallic effect pigments of claim 1, wherein the process comprises coating the plateletlike metal core homogeneously and surroundingly in the presence of at least one of acrylate compounds and methacrylate compounds, and organofunctional silane.

13. A method of forming a material selected from the group consisting of paints, printing inks, varnishes, powder coating materials, plastics, and cosmetics, wherein the method comprises incorporating the metallic effect pigments of claim 1 into said material.

14. A coating system wherein the coating system comprises metallic effect pigments of claim 1.

15. The coating system of claim 14, wherein the coating system is selected from the group consisting of paints, printing inks, varnishes, powder coating materials, plastics, and cosmetics.

16. A coated article wherein the article is coated with the coating system of claim 14.

17. The metallic effect pigments of claim 8 wherein the compounds are selected from the group consisting of dipentaerythritol pentaacrylate, pentaerythritol triacrylate, pentaerythritol tetraacrylate, trimethylolpropane triacrylate, trimethylolpropane trimethacrylate, tris(2-hydroxyethyl)isocyanurate triacrylate and mixtures thereof.

* * * * *

UNITED STATES PATENT AND TRADEMARK OFFICE
CERTIFICATE OF CORRECTION

PATENT NO. : 8,697,776 B2  Page 1 of 1
APPLICATION NO. : 12/526123
DATED : April 15, 2014
INVENTOR(S) : Schumacher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 872 days.

Signed and Sealed this
Twenty-ninth Day of September, 2015

Michelle K. Lee
*Director of the United States Patent and Trademark Office*